United States Patent [19]

Miura et al.

[11] Patent Number: 5,155,173
[45] Date of Patent: Oct. 13, 1992

[54] FLUORINE-CONTAINING COPOLYMER, PROCESS FOR ITS PRODUCTION AND CURABLE COMPOSITION

[75] Inventors: Ryuichi Miura, Yokohama; Ken Moriwaki, Kawasaki; Hiromitu Takeyasu, Tokyo; Hiroshi Washita; Nobuyuki Miyazaki, both of Yokohama, all of Japan

[73] Assignee: Asahi Glass Company, Ltd., Tokyo, Japan

[21] Appl. No.: 767,688

[22] Filed: Sep. 30, 1991

Related U.S. Application Data

[62] Division of Ser. No. 556,374, Jul. 23, 1990, Pat. No. 5,096,989, which is a division of Ser. No. 354,197, May 19, 1989, Pat. No. 5,073,613.

[30] Foreign Application Priority Data

May 24, 1988 [JP] Japan ................... 63-124908
Mar. 17, 1989 [JP] Japan ................... 63-63910

[51] Int. Cl.$^5$ ............................. C08C 19/22
[52] U.S. Cl. ..................... 525/374; 525/326.3; 524/413; 524/425; 524/444; 524/445; 524/451; 524/431; 524/432; 524/544
[58] Field of Search .............. 525/326.3, 374; 524/413, 425, 431, 432, 444, 445, 451, 544

[56] References Cited

FOREIGN PATENT DOCUMENTS

| | | |
|---|---|---|
| 121934 | 10/1984 | European Pat. Off. . |
| 180962 | 5/1986 | European Pat. Off. . |
| 185526 | 6/1986 | European Pat. Off. . |
| 276649 | 8/1988 | European Pat. Off. . |
| 2081727 | 2/1982 | United Kingdom . |
| 2168358 | 6/1986 | United Kingdom . |
| 2189794 | 11/1987 | United Kingdom . |
| 2218707 | 11/1989 | United Kingdom . |

OTHER PUBLICATIONS

European Search Report on European Patent Application EP 89 10 9039 Dated Apr. 11, 1990.

*Primary Examiner*—Joseph L. Schofer
*Assistant Examiner*—N. Sarofin
*Attorney, Agent, or Firm*—Oblon, Spivak, McClelland, Maier & Neustadt

[57] ABSTRACT

A fluorine-containing copolymer having fluidity at room temperature and comprising, based on entire polymer units, from 20 to 70 mol % of polymer units (1) derived from a polyfluoroolefin and from 1 to 80 mol % of polymer units (2) having a polyoxyalkylene chain having, at its terminal, a group selected from the group consisting of an active hydrogen-containing group, an epoxy group and a functional group cross-linkable by the action of moisture, the total of the polymer units (1) and the polymer units (2) being from 30 to 100 mol %.

20 Claims, No Drawings

FLUORINE-CONTAINING COPOLYMER, PROCESS FOR ITS PRODUCTION AND CURABLE COMPOSITION

This is a continuation of application Ser. No. 07/556,374, filed on Jul. 23, 1990, now U.S. Pat. No. 5,096,989, which is a division of U.S. Ser. No. 07/354,197 filed May 19, 1989 now U.S. Pat. No. 5.073,613.

The present invention relates to a fluorine-containing copolymer, a process for its production and a curable composition.

Heretofore, in the field of sealing materials or coating materials, it has been desired to develop a resin which is excellent in the stretchability and weather resistance and which is curable at room temperature. In recent years, in addition to such requirements, there have been requirements for overcoatability and for solving a problem of formation of stain due to migration of a low molecular weight silicone oil or plasticizer contained in the resin such as a silicone resin, which may otherwise fulfill the above-mentioned requirements.

For example, in the case of sealing materials, there has been a development from a non-stretchable oily caulking material to an elastic urethane or polysulfide material. Further, a weather resistant silicone material has been developed. However, it has a drawback that the staining due to allow molecular weight silicone oil is substantial. Under the circumstances, a modified silicone has been developed wherein the backbone structure is a polyalkylene oxide, and siloxane linkages are present only at the cross-linked sites. However, there still is a case where the weather resistance, etc. are inadequate, and such does not provide an adequate solution.

On the other hand, as a resin curable at room temperature having high weather resistance, a fluoroolefin-vinylether copolymer has been known, and it is used for a coating composition. The coating composition made of such resin is excellent in the weather resistance and serves to increase the durability of a building stricture, and its usefulness for industrially application is being recognized.

However, a resin having higher flexibility is desired for application to sealing materials, elastomers, waterproofing material, adhesives, PCM coating materials or elastic coating materials which require high stretchability in addition to the weather resistance as in the present application. Further, from the viewpoint of practical application, a composition of one-pack type is desired.

It is an object of the present invention to solve the above-mentioned problems.

The present invention provides a fluorine-containing copolymer having fluidity at room temperature and comprising, based on entire polymer units, from 20 to 70 mol % of polymer units (1) derived from a polyfluoroolefin and from 1 to 80 mol % of polymer units (2) having a polyoxtyalkylene chain having, at its terminal, a group selected from the group consisting of an active hydrogen-containing group, an epoxy group and a functional group cross-linkable by the action of moisture, the total of the polymer units (1) and the polymer units (2) being from 30 to 100 mol %.

The present invention also provides a process for producing a fluorine-containing copolymer, which comprises polymerizing a fluoroolefin and a monomer having a polyoxyalkylene chain having, at its terminal, a group selected from the group consisting of an active hydrogen-containing group, an epoxy group and a functional group cross-linkable by the action of moisture and an $\alpha,\beta$-unsaturated group copolymerizable with the fluoroolefin.

The present invention further provides a process for producing a fluorine-containing copolymer having a polyoxyalkylene chain having a hydroxyl group at its terminal, which comprises adding an alkylene oxide to a fluorine-containing copolymer comprising, based on entire polymer units, from 20 to 70 mol % of polymer units (1) derived from a fluoroolefin and from 1 to 80 mol % of polymer units (3) having a functional group to which the alkylene oxide is to be added, the total of the polymer units (1) and the polymer units (3) being from 30 to 100 mol %.

The present invention further provides a process for producing a fluorine-containing copolymer having a functional group cross-linkable by the action of moisture, which comprises reacting a fluorine-containing copolymer comprising, based on entire polymer units, from 20 to 70 mol % of polymer units (1) derived from a fluoroolefin and from 1 to 80 mol % of polymer units (4) having a polyoxyalkylene chain having a reactive group at its terminal, the total of the polymer units (1) and the polymer units (4) being from 30 to 100 mol %, and a compound having a functional group reactive with the reactive group of the fluorine-containing copolymer and a functional group cross-linkable by the action of moisture.

Further, the present invention provides a curable composition comprising a curing agent and a fluorine-containing copolymer having fluidity at room temperature and comprising, based on entire polymer units, from 20 to 70 mol % of polymer units (1) derived from a fluoroolefin and from 1 to 80 mol % of polymer units (2') having a polyoxyalkylene chain having, at its terminal group, a group selected from the group consisting of an active hydrogen-containing group and an epoxy group, the total of the polymer units (1) and the polymer units (2') being from 30 to 100 mol %.

Still further, the present invention provides a curable composition containing a fluorine-containing copolymer having fluidity at room temperature and comprising, based on entire polymer units, from 20 to 70 mol % of polymer units (1) derived from a fluoroolefin and from 1 to 80 mol % of polymer units (2') having a polyoxyalkylene chain having, at its terminal, a functional group cross-linkable by the action of moisture, the total of the polymer units (1) and the polymer units (2") being from 30 to 100 mol %.

Now, the present invention will be described in detail with reference to the preferred embodiments.

The fluorine-containing copolymer of the present invention contains from 20 to 70 mol % of polymer units (1) derived from a fluoroolefin. The fluoroolefin is preferably a fluoroolefin having from 2 to 6 carbon atoms, more preferably from 2 to 4 carbon atoms, such as tetrafluoroethylene, chlorotrifluoroethylene, trifluoroethylene, vinylidene fluoride, vinyl fluoride, hexfluoropropylene or pentafluoroethylene. Among them, a perfluoroolefin is most preferred wherein hydrogen is completely substituted by halogen. If the polymer units derived from a fluoroolefin are less than 20 mol %, no adequate weather resistance will be obtained, and staining tends to be substantial during the use for a long period of time, such being undesirable. If the amount of the fluoroolefin exceeds 70 mol %, it tends to be difficult to obtain good elasticity or good adhesion to other materials, such being undesirable. It is particularly preferred that the copolymer contains from 30 to 70 mol % of the polymer units derived from a fluoroolefin.

The fluorine-containing copolymer of the present invention further contains from 1 to 80 mol % of polymer units (2) having a polyoxyalkylene chain having, at its terminal, a group selected from the group consisting of an active hydrogen-containing group, an epoxy group and a functional group cross-linkable by the action of moisture. By virtue of such specific polymer units (2), the cured product can be an elastomer having excellent elasticity. Here, the active hydrogen-containing group may be a hydroxyl group, a carboxylic acid group, an amino group, an acid amide group or a thiol group. The functional group cross-linkable by the action of moisture may be an isocyanate group, a hydrolyzable silyl group or a thiol group. If the proportion of the polymer units (2) is too small, it becomes difficult to obtain a good elastomer. On the other hand, if the proportion is too large, the weather resistance or the stain resistance tends to be low. It is particularly preferred that the copolymer contains from 3 to 30 mol % of the polymer units (2).

The polymer units (2) may be those wherein the polyoxyalkylene chains as side chains are comprised solely of ether bonds and carbon-carbon bonds, or those which contain other bonds such as urethane bonds, ester bons or amino bonds between the main chain and the polyoxyalkylene chain. The polyoxyalkylene chain may be the one having at least two oxyalkylene units. If the number of oxyalkylene units is small, it tends to be difficult to obtain a desired elastomer. The larger the number of the oxyalkylene units, the better the elasticity of the elastomer. However, if it is too much, the weather resistance or stain resistance tends to be low. It is usually preferred that the number of oxyalkylene units is at most 50, more preferably at most 40. The oxyalkylene units are preferably oxyalkylene units having from 2 to 8 carbon atoms such as oxyethylene units, oxypropylene units or oxybutylene units. Such oxyalkylene chain may be composed of oxyalkylene units of the same type or oxyalkylene units of a plurality of different types. If oxyalkylene units having a small carbon number are used alone as the oxyalkylene units, the water resistance tends to be low. On the other hand, id oxyalkylene units having a large carbon number are used alone, the oil resistance tends to be low. It is particularly preferred to employ a polyoxyalkylene chain composed mainly of oxyalkylene units having from 3 to 6 carbon atoms. The oxyalkylene units may be those wherein a part of hydrogen bonded to carbon is substituted by halogen such as fluorine or chlorine, or by an alkyl group or an aryl group. Further, when the fluorine-containing copolymer of the present invention is used as a base for an elastic coating material, it is preferred to employ a polyoxyalkylene chain having at least five oxyalkylene units. Likewise, when the copolymer is used as a sealant base, it is preferred to employ a polyoxyalkylene chain having at least ten oxyalkylene units.

As mentioned above, this polyalkylene chain has, at its terminal, an active hydrogen-containing group, an epoxy group or a functional group cross-linkable by the action of moisture. Such an active hydrogen-containing group, an epoxy group or a functional group cross-linkable by the action of moisture, may be bonded directly to the terminal of the polyoxyalkylene chain, or may be bonded via other bond such as a urethane bond or an ester bond.

The fluorine-containing copolymer of the present invention may further contain other polymer units in addition to the above-described polymer units (1) and (2). In such a case, the total of the polymer units (1) and the polymer units (2) is from 30 to 100 mol % based on the entire polymer units. If the proportion of the polymer units (1) and (2) is too small, no adequate weather resistance, stain resistance and elasticity can be obtained. Here, other polymer units may be polymer units derived from a monomer copolymerizable with the fluoroolefin. The monomer copolymerizable with the fluoroolefin, may be an ethylenically unsaturated compound such as a vinyl compound, an allyl compound, an acryloyl compound or a methacryloyl compound. When polymer units other than the polymer units (1) and (2) are contained, a larger amount of polymer units will be contained among the polymer units (2), whereby the elasticity will be obtained more effectively.

The fluorine-containing copolymer of the present invention has fluidity at room temperature. Specifically, it preferably has fluidity at a level such that it is deformable by its own weight at 25° C. More specifically, it preferably has a viscosity of at most 100,000 centipoise (hereinafter referred to simply as cp) at 25° C. A fluorine-containing copolymer having a viscosity being too high is undesirable since the practical applicability is thereby extremely low in its application to e.g. a sealant. A copolymer having a viscosity of at most 20,000 cp at 25° C. is particularly preferred, since it provides excellent practical applicability even when used without any solvent. There is no particular limitation to the lower limit of the viscosity. However, it is usual to employ a fluorine-containing copolymer having at least 300 cp at 25° C.

The fluorine-containing copolymer of the present invention can be prepared by e.g. the following processes.

Firstly, there may be mentioned a process which comprises polymerizing a fluoroolefin and a monomer having a polyoxyalkylene chain having, at its terminal, a group selected from the group consisting of an active hydrogen-containing group, an epoxy group and a functional group cross-linkable by the action of moisture, and an $\alpha,\beta$-unsaturated group copolymerizable with the fluoroolefin.

Secondly, there may be mentioned a process which comprises addition-reacting an alkylene oxide to a fluorine-containing copolymer (hereinafter referred to as a fluorine-containing copolymer X) comprising, based on entire polymer units, from 20 to 70 mol % of polymer units derived from a fluoroolefin and from 1 to 80 mol % of polymer units (3) having a functional group to which an alkylene oxide is to be added, the total of the polymer units (1) and the polymer units (3) being from 30 to 100 mol %.

Thirdly, there may be mentioned a process which comprises reacting a fluorine-containing copolymer (hereinafter referred to as a fluorine-containing copolymer Y) comprising, based on entire polymer units, from 20 to 70 mol % of polymer units (1) derived from a fluoroolefin and from 1 to 80 mol % of polymer units (4) having a polyoxyalkylene chain having a reactive group at its terminal, the total of the polymer units (1) and the polymer units (4) being from 30 to 100 mol % with a compound having a functional group reactive with the reactive group of the fluorine-containing copolymer Y and a functional group cross-linkable by the action of moisture.

In the first process, the monomer having a polyoxyalkylene chain having at its terminal, an active hydrogen-containing group, an epoxy group or a functional group cross-linkable by the action of moisture and an $\alpha,\beta$-unsaturated group copolymerizable with the fluoroolefin, may preferably be a monomer having an $\alpha,\beta$-unsaturated group, such as a vinyl group, an allyl group, an acryloyl group or a methacryloyl group. Such a monomer may be prepared by a method which comprises addition-reacting an alkylene oxide to a hydroxyl group-containing monomer such as a hydroxyalkylene ether, a hydroxyalkylallyl ether, a reaction product of acrylic acid with a polyhydric alcohol, a reaction product of glycidylallyl ether with an alkanol amine or a phenol compound or allyl alcohol, or a method which comprises reacting a monomer having a reactive group such as a hydroxyl group, an alkoxysilyl group, an epoxy group or an amino group with a polyoxyalkylene compound having a group reactive with the above reactive group, such as an isocyanate group, an alkoxysilyl group or a carboxylic acid group. Further, it may be obtained by a method which comprises reacting to the monomer obtained by such a method, a compound having a functional group curable by the action of moisture, such as a diisocyanate compound, an isocyanate alkylsilane compound, a silylisocyanate compound or a mercaptoalkanoic acid. In this first process, if only one type of the fluoroolefin and only one type of the monomer having a polyoxyalkylene chain are polymerized, it is highly likely that they undergo alternating copolymerization. Particularly when the monomer having a polyoxyalkylene chain is a vinyl compound or an allyl compound, this possibility is extremely high. In the case of alternating copolymerization, other polymerization units present between polymer units (2) will be as little as only about one, whereby the resulting polymer tends to hardly have good flexibility or elasticity. It is preferred to employ at least two different kinds of compounds for either one or both of the fluoroolefin and the monomer having a polyoxyalkylene chain. Otherwise, in addition to the fluoroolefin and the monomer having a polyoxyalkylene chain, other comonomer copolymerizable therewith, may be copolymerized so that a number of such other polymer units will be present among the polymer units (2) in the resulting polymer. Usually, the latter method of copolymerizing a comonomer is employed. Here, the commoner may be a compound having a pulverizable site such as a vinyl group, an allyl group, an acryloyl group or a methacryloyl group. Specifically, olefins, vinyl ethers, vinyl esters, allyl ethers, allyl esters, acrylic acid esters and methacrylic acid esters may be mentioned. Particularly preferred is a compound having a linear, branched or alicyclic alkyl group having from 1 to 15 carbon atoms. Such a commoner may be the one wherein a part or all of hydrogen bonded to carbon is substituted by fluorine. In this first process, the proportion of the polymer units (1) is from 20 to 70 mol %, and the proportion of the polymer units (2) is from 1 to 80 mol %, and the total of the polymer units (1) and the polymer units (2) is preferably at least 30 mol %, based on the entire polymer units. Such polymerization may be conducted by any one of solution polymerization, emulsion polymerization, suspension polymerization and bulk polymerization. A polymerization initiator or a polymerization initiating source such as ionizing radiation is applied to the predetermined amounts of monomers to conduct the polymerization. Various other conditions may be similar to those commonly employed for solution polymerization, emulsion polymerization, suspension polymerization or bulk polymerization.

In the second process, the fluorine-containing copolymer X can be prepared by copolymerizing a fluoroolefin, a monomer having a functional group to which an alkylene oxide can be added or a group convertible to such a functional group, and if necessary, other comonomer. Here, a hydroxyl group or a carboxyl group is a typical example for the functional group to which an alkylene oxide can be added. Here, the monomer having such a functional group or a group convertible to such a functional group, includes a hydroxyalkyl vinyl ether, a hydroxyalkyl allyl ether, a hydroxyalkyl vinyl ester, a hydroxylakyl allyl ester, a glycidyl vinyl ether, a glycidyl allyl ether, an aminoalkyl vinyl ether, an aminoalkyl allyl ether, an aminoalkyl vinyl ester, an aminoalkyl allyl ether, acrylic acid, methacrylic acid and allyl vinyl ether. As the group convertible to the functional group to which an alkylene oxide can be added, an ester group hydrolyzable after the polymerization, may be mentioned. Further, if necessary, it may be converted to other functional group to which an alkylene oxide can be added, after polymerization. For example, there may be mentioned a method wherein a polybasic carboxylic acid or its anhydride is added to a hydroxyl group to convert it to a carboxylic acid group, or a method wherein an alkanol amine or a phenol compound is reacted to an epoxy group to convert it to a hydroxyl group. In the preparation of the fluorine-containing copolymer X, a monomer similar to the comonomer described with respect to the above first process, may be copolymerized. In this case, it is preferred to control the polymerization so that the proportion of the polymer units (1) will be from 20 to 70 mol %, the proportion of the polymer units (3) will be from 1 to 80 mol %, and the total of the polymer units (1) and the polymer units (3) will be from 30 to 100 mol %, based on the entire polymer units of the copolymer. For the polymerization, a method of polymerization similar to the one described with respect to the first process, may be employed. The addition of an alkylene oxide to the fluorine-containing copolymer X thus prepared, can be conducted in the same manner as the production of a usual polyether compound.

In the third process, the fluorine-containing copolymer Y can be prepared by the following methods.

Firstly, there may be mentioned a method which comprises polymerizing a fluoroolefin and a monomer copolymerizable with a fluoroolefin and having a polyoxyalkylene chain having a reactive group at the terminal.

Secondary, there may be mentioned a method which comprises reacting a fluorine-containing copolymer Y' comprising from 20 to 70 mol % of polymer units (1) derived from a fluoroolefin and from 10 to 80 mol % of polymer units (5) having a reactive group, the total of the polymer units (1) and the polymer units (5) being at least 30 mol %, based on entire polymer units, and a polyoxyalkylene compound having a group reactive with the reactive group of the fluorine-containing copolymer Y'.

Thirdly, there may be mentioned a method which comprises addition-reacting an alkylene oxide to the fluorine-containing copolymer Y" comprising from 20 to 70 mol % of polymer units (1) derived from a fluoroolefin and from 1 to 80 mol % of polymer units (6) having a hydroxyl group, the total of the polymer units (1) and the polymer units (6) being at least 30 mol %, based on entire polymer units.

The first method may be conducted in the same manner as described with respect to the above first process.

The fluorine copolymer Y' in the second method can be prepared in accordance with the method for the production of the fluorine-containing copolymer X in the above-mentioned second process. Further, the polyoxyalkylene compound capable of reacting with the fluorine-containing copolymer Y', can be prepared by a method which comprises reacting a compound such as an alkanol amine, a polyvalent isocyanate compound, an isocyanate alkyl acrylate, a silyl isocyanate or a polybasic carboxylic anhydride to a polyoxyalkylene having an alkylene oxide added in accordance with a usual method, or a method which comprises adding an alkylene oxide by a usual method to a compound such as a hydroxyalkyl vinyl ether.

The third method may be conducted in the same manner as the second process descried above.

In the third method, the reactive group in the fluoride-containing copolymer Y may be a hydroxyl group, a carboxylic acid, group, an amino group, an acid amide group, a thiol group, an active halogen-containing group, an epoxy group or an ethylenically unsaturated group. The compound having a functional group cross-linkable by the action of moisture, to be reacted to the fluorine-containing copolymer Y includes, for example, a polyvalent isocyanate compound such as hexamethylene diisocyanate or toluene diisocyanate, an isocyanate alkylsilane compound such as $\gamma$-isocyanate proplymethyldimethoxysilane, a silylisocyanate compound such as trimethoxysilyl isocyanate, a hydrolyzable silyl group-containing compound such as 4-trimethoxysilyl-tetrahydropthalic anhydride, or a thiol group-containing compound such as a mercapto alkanoic acid or a thiodialkanoic acid. The reaction of the fluorine-containing copolymer Y and the above compound, is preferably conduced by reacting an excess equivalent of the above-mentioned compound to the reactive group in the fluorine-containing copolymer Y. If the amount of the above compound to be reacted is small, gellation is likely to result, such being undesirable. It is particularly preferred to react at least one mol of the above identified compound per mol of the reactive group in the fluorine-containing copolymer Y.

The fluorine-containing copolymer of the present invention is suitable for use as a base for e.g. a sealant or an elastic coating material.

Among the fluorine-containing copolymers of the present invention, one having an active hydrogen-containing group or an epoxy group at the terminal of the polyoxyalkylene chain (hereinafter referred to as a fluorine-containing copolymer (a)) ma be combined with a curing agent to obtain a curable composition (hereinafter referred to as a composition (a)). Likewise, among the fluorine-containing copolymers of the present invention, one having a functional group cross-linkable by the action of moisture at the terminal of the polyoxyalkylene chain (hereinafter referred to as a fluorine-containing copolymer (b)) makes a curable composition (hereinafter referred to as a composition (b)) even without incorporating a curing agent. Hereinafter, the composition (a) and the composition (b) are generally referred to simply as a composition. Further, the curable composition (b) may contain a curing agent.

As the curing agent for the composition (a), a compound may be employed which is capable of reacting with the active hydrogen-containing group or the epoxy group of the fluorine-containing copolymer (a) to form a cross-linkage. For example, a polyvalent isocyanate compound, an aminoplasto compound or a polyvalent amino compound may be mentioned. Among them, a polyol-modified polyisocyanate compound is preferred, since it presents a cured product having excellent elasticity. When a polyvalent isocyanate compound is used as the curing agent, curing can be conducted with moisture, and the practical applicability is excellent. In this case, from the viewpoint of the reactivity with an isocyanate group, it is particularly preferred to employ as the fluorine-containing copolymer (a) a copolymer having an active hydrogen-containing group, particularly, a hydroxyl group.

To the composition of the present invention, additives such as a filler, a curing catalyst, a solvent, a photo stabilizer, an ultraviolet absorber, a heat stabilizer, a leveling agent, a defoaming or a foam suppressing agent, may be incorporated, as the case requires.

The filler includes reinforcing fillers such as fumed silica, precipitated silica, silicic anhydride, hydrous silicic acid and carbon black, fillers such as calcium carbonate, magnesium carbonate, diatomaceous earth, calcined clay;, clay, talc, surface-treated aluminum hydroxide, magnesium hydroxide, titanium oxide, bentonite, organic bentonite, ferric oxide, zinc oxide, active zinc white, hydrogenated castro oil and silica balloons; and fibrous fillers such as asbestos, glass fibers and glass filaments. The filler may be incorporated in an amount of from 1 to 500 parts by weight per 100 parts by weight of the fluorine-containing copolymer.

When a curable composition having a high strength is desired to be produced with such a filler, a good result can be obtained by using a filler selected from the group consisting of fumed silica, precipitated silica, silicic anhydride, hydrous silicic acid, carbon black, surface-treated fine calcium carbonate, calcined clay, clay and active zinc white in an amount of from 1 to 100 parts by weight per 100 parts by weight of the fluorine-containing copolymer. When a curable composition having good elongation with low strength is desired to be produced, a good result can be obtained by using a filler selected from the group consisting of titanium oxide, calcium carbonate, magnesium carbonate, talc, ferric oxide, zinc oxide and silica balloons in an amount of from 5 to 200 parts by weight per 100 parts by weight of the fluorine-containing copolymer. These fillers may, of course, be employed alone or in combination as a mixture of two or more different kinds.

Now, the present invention will be described with reference to Examples. However, it should be understood that the present invention is by no means restricted to such specific Examples.

PREPARATION EXAMPLES 1 TO 4

Hydroxybutyl vinyl ether (HBVE) and potassium hydroxide (concentration: 95%) were charged in the amounts as identified in Table 1 into a stainless steel pressure resistant reactor having an internal capacity of 5 l and equipped with a stirrer. Propylene oxide (PO) was gradually added thereto, and the reaction with conducted under a pressure of 3 kg/cm$^2$ at 110° C. for a predetermined period of time. The liquid thereby obtained was purified by synthetic magnesia to obtain a vinyl ether having a polyoxyalkylene chain. The mol amount of added PO in each vinyl ether is shown in Table 1.

TABLE 1

|  | Prep. Example 1 | Prep. Example 2 | Prep. Example 3 | Prep. Example 4 |
| --- | --- | --- | --- | --- |
| HBVE (g) | 1,200 | 580 | 454 | 312 |
| Potassium hydroxide (g) | 9 | 11 | 15 | 15 |
| PO (g) | 1,800 | 2,900 | 4,540 | 4,690 |
| Reaction time (hr) | 2 | 4 | 12 | 18 |
| Mol amount of added PO | 3 | 10 | 20 | 30 |

EXAMPLES 1 TO 6 AND COMPARATIVE EXAMPLES 1 AND 2

Into a stainless steel pressure resistant reactor having an internal capacity of 550 ml and equipped with a stirrer, 112 g of xylene, 112 g of ethonal, 1.6 g of potassium carbonate and 0.5 g of azoisobutyronitrile were charged, and the monomer composition as identified in Table 2 was thereby polymerized. The polymerization was conducted by charging monomers other than chlorotrifluoroethylene (CTFE) or tetrafluoroethylene (TFE), then dissolved air was removed under reduced pressure after liquid was frozen by liquid nitrogen, then introducing CTFE or TFE, gradually raising the temperature, maintaining the temperature at 65° C., continuing the polymerization reaction under stirring for 10 hours, then cooling the reactor with water to terminate the polymerization. The reactor was cooled to room temperature, and then unreacted monomers were withdrawn, and the reactor was opened. The polymer solution was filtered, and then the solvent was removed by an evaporator to obtain a fluorine-containing copolymer. The hydroxyl value (KOH mg/g), the number average molecular weight, the glass transition temperature and the viscosity at 25° C., of the fluorine-containing copolymer thus obtained, are shown in Table 2.

In the molecular weight measurement (by using G.P.C) of the fluorine-containing copolymer in each Example, no substantial peak corresponding to the vinyl ether obtained in Preparation Examples 1 to 4, was observed. This indicates that the vinyl ether having a polyoxypropylene chain has been copolymerized.

EXAMPLE 7

Into a stainless steel pressure resistant reactor having an internal capacity of 550 ml and equipped with a stirrer, 145 g of xylene, 145 g of ethanol, 33 g of EVE (ethyl vinyl ether), 5.5 g of HBVE (hydroxybutyl vinyl ether), 1 g of potassium carbonate and 0.5 g of AIBN (azoisobutyronitrile) were charged, and dissolved air was removed by solidification deaeration by means of liquid nitrogen. Then, 58 g of CTFE (chlorotrifluoroethylene) was introduced, and the mixture was gradually heated. The temperature was maintained at 65° C., and the reaction was continued under stirring. Ten hours later, the reactor was cooled with water to terminate the reaction. The reactor was cooled to room temperature, and unreacted monomers were withdrawn. Then, the reactor was opened. The reaction solution was filtered, and then the solvent was removed by an evaporator to obtain a fluorine-containing copolymer.

Further, into a stainless steel pressure resistant reactor having an internal capacity of 5 l and equipped with stirrer, 10 g of this fluorine-containing copolymer and 6 g of potassium hydroxide having a concentration of 95%, and 816 g of PO (propylene oxide) was gradually added. The reaction was conducted under a pressure of 3 kg/cm$^2$ at 110° C. for 10 hours, and a transparent brown liquid thereby obtained was purified by synthetic magnesia to obtain the desired fluorine-containing copolymer having a mol amount of added PO of 20 mol. The obtained copolymer had a hydroxyl value of 15 (KOH mg/g), a number average molecular weight of 10,000 as measured by GPC, a glass transition temperature of −25° C. and a viscosity of 12,000 cp at 25° C.

EXAMPLE 8

100 g of polyoxypropylene diol having a molecular weight of 1,000 and 15 g of dimethylsilyl diisocyanate were mixed and reacted to obtain a polyoxypropylene having a terminal isocyanate group. To 100 g of the fluorine-containing copolymer obtained in Comparative Example 1, 30 g of this polyoxypropylene having a terminal isocyanate group was reacted to obtain a fluorine-containing copolymer having a polyoxyalkylene chain. This fluorine-containing copolymer had a viscosity of 16,000 cp at 25° C.

TABLE 2

|  |  | Examples | | | | | | Comparative Examples | |
| --- | --- | --- | --- | --- | --- | --- | --- | --- | --- |
|  |  | 1 | 2 | 3 | 4 | 5 | 6 | 1 | 2 |
| Monomers (g) | CTFE | 71 | 59 | 65 | 59 | — | 63 | 58 | 59 |
|  | TFE | — | — | — | — | 43 | — | — | — |
|  | EVE | 38 | 36 | 30 | — | 30 | 16 | 33 | 29 |
|  | CHVE | — | — | — | 63 | — | — | — | — |
|  | HBVE | — | — | — | — | — | — | 5.5 | 12 |
|  | Vinyl ether of Prep. Example 2 | 60 | 5.5 | — | 5.5 | 80 | — | — | — |
|  | Vinyl ether of Prep. Example 3 | — | — | 180 | — | — | — | — | — |
|  | Vinyl ether of Prep. Example 4 | — | — | — | — | — | 180 | — | — |
| Hydroxyl value (KOH mg/g) |  | 28.4 | 8.4 | 28 | 8.4 | 37 | 19 | 27 | 57 |
| Number average molecular weight |  | 6,000 | 20,000 | 6,000 | 20,000 | 6,000 | 6,000 | 6,000 | 20,000 |
| Glass transition temp. (° C.) |  | −20 | −8 | −68 | 10 | −25 | −68 | 18 | 20 |
| Viscosity at 25° C. (cp) |  | 15,000 | 30,000 | 8,000 | 60,000 | 9,000 | 6,000 | Non-liquid | Non-liquid |

In Table 2, CTFE denotes chlorotrifluoroethylene, TFE denotes tetrafluoroethylene, EVE denotes ethyl vinyl ether, CHVE denotes cyclohexyl vinyl ether, and HBVE denotes hydroxybutyl vinyl ether.

TEST EXAMPLES 1 TO 7 AND COMPARATIVE TEST EXAMPLES 1 AND 2

To the fluorine-containing copolymers obtained in Examples 1 to 7 and Comparative Examples 1 and 2, a polyol-modified diisocyanate compound (Duranate D101, tradename, manufactured by Asahi Kasei) was added in an amount corresponding to NCO/OH =1, and 500 ppm of dibutyltin dilaurate was added as the catalyst to cure the composition. The cured product was tested for the breaking elongation, the breaking strength, the 50% modulus of elasticity, the surface adhesiveness and the weather resistance, and the results are shown in Table 3.

TEST EXAMPLE 8

The fluorine-containing copolymer obtained in Example 8 was cured with moisture. The cured product was tested for the breaking elongation, the breaking strength, the 50% modulus of elasticity, the surface adhesiveness and the weather resistance, and the results are shown in Table 3.

COMPARATIVE TEST EXAMPLE 3

A cured product was prepared in the same manner as in Test Example 1 except that instead of the fluorine-containing copolymer, a polyoxypropylene triol (hydroxyl value: 33.7 KOH mg/g) having a molecular weight of 5,000 was employed. This cured product was tested for the breaking elongation, the breaking strength, the 50% modulus of elasticity, the surface adhesiveness and the weather resistance, and the results are shown in Table 3.

COMPARATIVE TEST EXAMPLE 4

A cured product was prepared in the same manner as in Test Example 1 except that instead of the fluorine-containing copolymer, a fluorine-containing copolymer prepared by adding 3 mols of ε-caprolactone per mol of the hydroxyl group of the fluorine-containing copolymer of Comparative Example 1, was employed. The results of various tests of this cured product are shown in Table 3.

COMPARATIVE TEST EXAMPLE 5

A commercially available modified silicone-type sealing material was tested for the breaking elongation, the breaking strength, the 50% modulus of elasticity, the surface adhesiveness and the weather resistance, and the results are shown in Table 3.

under stirring to obtain a vinyl ether having a polyoxyalkylene chain having a methoxysilyl terminal group.

EXAMPLE 9

Into a glass container having an integral capacity of 300 ml, 16.8 g of hexamethylene diisocyanate (hereinafter referred to simply as HDI) was introduced, and 200 g of the fluorine-containing copolymer of Example 3 was gradually dropwise added thereto in a dry nitrogen gas stream under stirring. Then, the reaction was continued for 24 hours, and the infrared spectrum was measured, whereby it was confirmed that a half of the peak attributable to the isocyanate group of HDI was changed to a urethane bond. Then, the reaction was terminated by cooling to obtain 216.8 g of the fluorine-containing copolymer having an isocyanate group. This fluorine-containing copolymer had a viscosity of 9,000 cp at 25° C. Then, 0.01 g of dibutyltin dilaurate was added to this fluorine-containing copolymer, and the mixture was stored in a container purged with nitrogen, at 50° C. for 20 days. Then, the fluidity was examined, whereby no gellation was observed, and the fluidity was excellent. This fluorine-containing copolymer was coated in a thickness of 1 mm and left to stand still in a room under a standard condition at 20° C. under a relative humidity of 65%, whereby the copolymer cured in 24 hours. This indicates that this fluorine-containing copolymer has one pack type room temperature curability.

EXAMPLE 10

Into a glass container having an integral capacity of 300 ml, 11.5 g of HDI was introduced, and 200 g of the fluorine-containing copolymer of Example 6 was gradually dropwise added thereto in a dry nitrogen gas stream under stirring. Then, the reaction was continued for 24 hours, and the infrared absorption spectrum was measured, whereby it was confirmed that a half of the peak attributable to the isocyanate group of HDI was changed to a urethane bond. Then, the reaction was terminated by cooling to obtain 211.5 g of a fluorine-containing copolymer having an isocyanate group. This fluorine-containing copolymer had a viscosity of 8,000 cp at 25° C. Then, 0.01 g of dibutyltin dilaurate was

TABLE 3

|  | Test Examples | | | | | | | | Comparative Test Examples | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Fluorine-containing copolymer | Ex. 1 | Ex. 2 | Ex. 3 | Ex. 4 | Ex. 5 | Ex. 6 | Ex. 7 | Ex. 8 | Comp. Ex. 1 | Comp. Ex. 2 | — | — | — |
| Breaking elongation (%) | 600 | 900 | 950 | 700 | 900 | 1,100 | 950 | 750 | 100 | 89 | 850 | 150 | 600 |
| Breaking strength (kg/cm$^2$) | 7 | 10 | 9 | 18 | 10 | 10 | 13 | 11 | 60 | 130 | 13 | 50 | 6.5 |
| 50% Modulus of elasticity (kg/cm$^2$) | 3 | 6 | 2 | 14 | 4 | 1.5 | 5 | 5 | 25 | 850 | 2 | 20 | 10 |
| Surface adhesiveness (kg) | 0.4 | 0.2 | 0.5 | 0.1 | 0.3 | 0.4 | 0.3 | 0.4 | 0.1 | 0.05 | 2.0 | 0.2 | 0.6 |
| Weather resistance |  |  |  |  |  |  |  |  |  |  |  |  |  |
| Surface condition | ○ | ○ | ○ | ○ | ○ | ○ | ○ | ○ | ⊙ | ⊙ | X | ⊙ | ○ |
| Elongation retaining rate (%) | 80 | 85 | 85 | 85 | 85 | 85 | 80 | 83 | 95 | 97 | 55 | 93 | 65 |

PREPARATION EXAMPLE 5

To 100 g of the vinyl ether having a polyoxyalkylene chain obtained in Preparation Example 3, 16 g of γ-isocyanate propylmethyl dimethoxysilane was reacted in the presence of 0.01 g of dibutyltin dilaurate at room temperature under a nitrogen atmosphere for 4 hours added to this fluorine-containing copolymer, and the mixture was stored in a container purged with nitrogen, at 50° C. for 20 days. Then, the fluidity was examined, whereby no gellation was observed, and the fluidity was excellent. This fluorine-containing copolymer was coated in a thickness of 1 mm and left to stand still in a room under a standard condition at 20° C. under a relative humidity of 65%. The copolymer cured in 24 hours. This indicates that this fluorine-containing copolymer has one pack type room temperature curability.

COMPARATIVE EXAMPLE 3

A polymer having an isocyanate group was prepared in the same manner as in Example 9 except that instead of the fluorine-containing copolymer, 200 g of a trifunctional polypropylene glycol having a molecular weight of 5,000 and 20.2 of HDI were used. This polymer was also found to have one pack type room temperature curability.

EXAMPLE 11

Into a glass container having an integral capacity of 300 ml, 200 g of the fluorine-containing copolymer of Example 3, 20.4 g of γ-isocyanate propylmethyldimethoxiysialne and 0.02 g of dibutyltin dilaurate as a curing catalyst were charged and stirred at room temperature under a nitrogen atmosphere for 4 hours. The infrared absorption spectrum of the fluorine-containing copolymer thus obtained was measured, whereby it was confirmed that the absorption attributable to the isocyanate group disappeared, and an absorption peak attributable to a urethane bond appeared, and the copolymer had an alkoxysilyl group. This fluorine-containing copolymer had a viscosity of 8,500 cp at 25° C. Then, 1 g of dibutyltin dilaurate was added to this fluorine-containing copolymer, and the mixture was stored in a container purged with nitrogen gas, at 50° C. for 20 days. Then, the fluidity was examined, whereby no gellation was observed, and the fluidity was excellent. This fluorine-containing copolymer was coated in a thickness of 1 mm and left to stand still in a room under a standard condition at 20° C. under a relative humidity of 65%. the copolymer cured in 24 hours. This indicates that this fluorine-containing copolymer has one pack type room temperature curability.

EXAMPLE 12

Into a glass container having an integral capacity of 300 ml, 200 g of the fluorine-containing copolymer of Example 6, 14 g of γ-isocyanate propylmethyldimethoxiysialne and 0.02 g of dibutyltin dilaurate as a curing catalyst were charged and stirred at room temperature under a nitrogen atmosphere for 4 hours. The infrared absorption spectrum of the fluorine-containing copolymer thus obtained was measured, whereby it was confirmed that the absorption attributable to the isocyanate group disappeared, and an absorption peak attributable to a urethane bond appeared, and the copolymer had an alkoxysilyl group. This fluorine-containing copolymer had a viscosity of 8,000 cp at 25° C. Then, 1 g of dibutyltin dilaurate was added to this fluorine-containing copolymer, and the mixture was stored in a container purged with nitrogen gas, at 50° C. for 20 days. Then, the fluidity was examined, whereby no gellation was observed, and the fluidity was excellent. This fluorine-containing copolymer was coated in a thickness of 1 mm and left to standstill in a room under a standard condition at 20° C. under a relative humidity of 65%. the copolymer cured in 24 hours. This indicates that this fluorine-containing copolymer has one pack type room temperature curability.

COMPARATIVE EXAMPLE 4

A polymer having an isocyanate group was prepared in the same manner as in Example 11 except that instead of the fluorine-containing copolymer, 200 g of a trifunctional polypropylene glycol having a molecular weight of 5,000 and 23 of γ-isocyanate proplymethyldimethoxysilane were used. This polymer had a viscosity of 6,000 cp at 25° C. This polymer also had one pack type room temperature curability.

EXAMPLE 13

Into a glass container having an integral capacity of 300 ml, 200 g of the fluorine-containing copolymer having an isocyanate group of Example 9 was introduced, and 18 g of γ-aminopropyltrimethyldimethoxysilane was gradually dropwise added thereto in a dry nitrogen gas stream under stirring. Then, the reaction was continued for 8 hours, and the infrared absorption spectrum was measured, whereby it was confirmed that the absorption attributable to the isocyanate group disappeared, and it changed into a urea bond. Thus, a fluorine-containing copolymer having an alkoxysilyl group was obtained. This fluorine-containing copolymer had a viscosity of 11,000 cp at 25° C. Then, 1 g of dibutyltin dilaurate was added to this fluorine-containing copolymer, and the mixture was stored in a container purged with nitrogen gas, at 50° C. for 20 days. Then, the fluidity was examined, whereby no gellation was observed, and the fluidity was excellent. This fluorine-containing copolymer was coated in a thickness of 1 mm and left to stand still in a room under a standard condition at 20° C. under a relative humidity of 65%. the copolymer cured in 24 hours. This indicates that this fluorine-containing copolymer has one pack type room temperature curability.

EXAMPLE 14

Into a glass container having an integral capacity of 300 ml, 200 g of the fluorine-containing copolymer having an isocyanate group of Example 10 was introduced, and 12 g of γ-aminopropyltrimethyoxysilane was gradually dropwise added thereto in a dry nitrogen gas stream under stirring. Then, the reaction was continued for 8 hours, and the infrared absorption spectrum was measured, whereby it was confirmed that the absorption attributable to the isocyanate group disappeared, and it changed into a urea bond. Thus, a fluorine-containing copolymer having an alkoxysilyl group was obtained. This fluorine-containing copolymer had a viscosity of 9,000 cp at 25° C. Then, 1 g of dibutyltin dilaurate was added to this fluorine-containing copolymer, and the mixture was stored in a container purged with nitrogen gas, at 50° C. for 20 days. Then, the fluidity was examined, whereby no gellation was observed, and the fluidity was excellent. This fluorine-containing copolymer was coated in a thickness of 1 mm and left to stand still at room temperature under a standard condition at 20° C. under a relative humidity of 65%. The copolymer cured in 24 hours. This indicates that this fluorine-containing copolymer has one pack type room temperature curability.

COMPARATIVE EXAMPLE 5

A polymer having an isocyanate group was prepared in the same manner as in Example 13 except that instead of the fluorine-containing copolymer, 200 g of the polymer obtained in Comparative Example 3 and 21 g of γ-aminopropylmethyldimethoxysilane were used. This polymer also had one pack type room temperature curability.

EXAMPLE 15

Into a glass container having an integral capacity of 300 ml, 200 g of the fluorine-containing copolymer of Example 3 was introduced, and 0.06 g of triethylamine was added thereto. Then, 27.2 g of 4-trimethoxysilyl tetrahydrophthalic anhydride was gradually dropwise added thereto in a dry nitrogen gas stream at 50° C. Then, the reaction was continued for 5 hours, and the infrared absorption spectrum was measured, whereby it was confirmed that the absorption peak attributable to the hydroxyl group disappeared, and a peak attributable to a carboxylic acid appeared, Then, the reaction was terminated by cooling to obtain 236.8 g of a fluorine-containing copolymer having an alkoxysilyl group. This fluorine-containing copolymer had a viscosity of 9,500 cp at 25° C. Then, 1 g of dibutyltin dilaurate was added to this fluorine-containing copolymer, and the mixture was stored in a container purged with nitrogen gas, at 50° C. for 20 days. Then, the fluidity was examined, whereby no gellation was observed, and the fluidity was excellent. This fluorine-containing copolymer was coated in a thickness of 1 mm and left to stand still in a room under a standard condition at 20° C. under a relative humidity of 65%. the copolymer cured in 24 hours. This indicates that this fluorine-containing copolymer has one pack type room temperature curability.

COMPARATIVE EXAMPLE 6

A polymer having an isocyanate group was prepared in the same manner as in Example 14 except that instead of the fluorine-containing copolymer, 200 g of a trifunctional polypropylene glycol having a molecular weight of 5,000 and 32.6 of 4-trimethoxysilyl tetrahydrophthalic anhydride were used. This polymer was also found to have one pack type room temperature curability.

EXAMPLE 16

Into a glass container having an integral capacity of 300 ml, 200 g of the fluorine-containing copolymer having an isocyanate group of Example 9 was introduced, and 5.8 g of allyl alcohol was gradually dropwise added in a dry nitrogen gas stream at 80° C. under stirring. Then, the reaction was continued for 24 hours. The infrared absorption spectrum of the reaction product was measured, whereby no peak attributable to the isocyanate group was detected, and a peak attributable to a urethane bond was detected. To 100 g of the fluorine-containing copolymer thus obtained, 8 g of β,β'-dimercaptodiethylether, 0.5 g of t-butyl perbenzoate and 0.05 g of tetramethylguanidine were added, and the mixture was slowly stirred and then left to stand still at 60° C. for 16 hours. From the infrared spectrometry, it was confirmed that the product had no double bond. This fluorine-containing copolymer had a viscosity of 13,000 cp at 25° C. To this fluorine-containing copolymer, 0.5 g of lead dioxide was added, and the fluidity was examined, whereby no gellation was observed, and the fluidity was excellent. This fluorine-containing copolymer was coated in a thickness of 1 mm and left to stand still at room temperature under a standard condition at 20° C. under a relative humidity of 65%. the copolymer cured in 24 hours. This indicates that this fluorine-containing copolymer has one pack type room temperature curability.

EXAMPLE 17

Into a stainless steel pressure resistant container having an integral capacity of 550 ml equipped with a stirrer, 112 g of xylene, 112 of ethanol, 1.6 g of potassium carbonate and 0.5 g of azoisobutyronitrile were charged, and 194 g of the vinyl ether obtained in Preparation Example 5, 19 g of cyclohexyl vinyl ether and 11 of ethyl vinyl ether were charged. Then, dissolved air was removed by means of liquid nitrogen. Then, 51 g of chlorotrifluoroethylene was introduced. The temperature was gradually raised and then maintained at 65° C., and the polymerization reaction was continued under stirring for 10 hours. The reactor was cooled with water to terminate the polymerization. Then, the reactor was cooled to room temperature, unreacted monomers were withdrawn, and the reactor was opened. The polymer solution was filtered, and then the solvent was removed by an evaporator to obtain a fluorine-containing copolymer. The obtained fluorine-containing copolymer had a number average molecular weight of 6,500, a glass transition temperature of −68° C. and a viscosity of 9,000 cp at 25° C. In the molecular weight measurement, (by means of G.P.C.). of this fluorine-containing copolymer, no substantial peak corresponding to the vinyl ether obtained in Preparation Example 5 was observed. This indicates that the vinyl ether having the polyoxyalkylene chain was copolymerized.

TEST EXAMPLES

To 100 g of each of the fluorine-containing copolymers obtained in Examples 8 to 17 and Comparative Examples 3 to 6, the curing catalyst, titanium oxide and calcium carbonate were added as identified in Table 4, and the mixture was coated in a thickness of 2 m on a stainless steel plate and left to stand at 20° C. under a relative humidity of 65%. With respect to the films thus obtained, the breaking elongation (%), the breaking strength (kg/cm²), the 50% modulus of elasticity, the surface adhesiveness and the weather resistance were evaluated. The results are shown in Table 4.

TABLE 4

| | Test Examples | | | | | | | | | Comparative Test Examples | | | |
|---|---|---|---|---|---|---|---|---|---|---|---|---|---|
| | 9 | 10 | 11 | 12 | 13 | 14 | 15 | 16 | 17 | 3 | 4 | 5 | 6 |
| Fluorine-containing copolymer | Ex. 9 | Ex. 10 | Ex. 11 | Ex. 12 | Ex. 13 | Ex. 14 | Ex. 15 | Ex. 16 | Ex. 17 | Comp. Ex. 3 | Comp. Ex. 4 | Comp. Ex. 5 | Comp. Ex. 6 |
| Curing catalyst 1 (g) | 0.01 | 0.01 | 1.0 | 1.0 | 1.0 | 1.0 | 1.0 | — | 0.01 | 1.0 | 1.0 | 1.0 | 1.0 |
| Curing catalyst 2 (g) | — | — | — | — | — | — | — | 0.5 | — | — | — | — | — |
| Titanium oxide (g) | 4 | 4 | 4 | 4 | 4 | 4 | 4 | 4 | 4 | 4 | 4 | 4 | 4 |
| Calcium carbonate (g) | 76 | 76 | 76 | 76 | 76 | 76 | 76 | 76 | 76 | 76 | 76 | 76 | 76 |
| Breaking elongation (%) | 300 | 500 | 400 | 700 | 400 | 600 | 350 | 450 | 450 | 350 | 400 | 400 | 400 |
| Breaking strength (kg/cm²) | 17 | 15 | 17 | 16 | 18 | 17 | 14 | 15 | 16 | 14 | 15 | 16 | 13 |
| 50% Modulus of | 5 | 3 | 4 | 2 | 5 | 3 | 4 | 2 | 3 | 4 | 3 | 4 | 3 |

TABLE 4-continued

| | Test Examples | | | | | | | | | Comparative Test Examples | | | |
|---|---|---|---|---|---|---|---|---|---|---|---|---|---|
| | 9 | 10 | 11 | 12 | 13 | 14 | 15 | 16 | 17 | 3 | 4 | 5 | 6 |
| elasticity (kg/cm$^2$) | | | | | | | | | | | | | |
| Surface adhesiveness (kg) | 0.2 | 0.3 | 0.1 | 0.2 | 0.2 | 0.3 | 0.1 | 0.1 | 0.1 | 1.5 | 1.2 | 1.0 | 1.0 |
| Weather resistance | | | | | | | | | | | | | |
| Surface condition | ⊙ | ○ | ⊙ | ⊙ | ⊙ | ○ | ⊙ | ○ | ⊙ | X | X | X | X |
| Elongation retaining rate (%) | 85 | 80 | 90 | 85 | 85 | 80 | 85 | 80 | 92 | 50 | 55 | 50 | 55 |

Curing catalyst 1 is dibutyltin dilaurate
Curing catalyst 2 is lead dioxide

In each Test Example, the breaking elongation, the breaking strength and the 50% modulus elasticity were measure in accordance with JIS K6301. The surface adhesiveness was measured under a load of 100 g by means of a Pictamac (manufactured by Toyo Seiki). The weather resistance was evaluated by the surface condition (⊙: no change, ○: no substantial problem although some decrease in gloss was observed, X: substantial deterioration in the surface condition) and the elongation retaining rate (breaking elongation after the weather resistant test/initial breaking elongation x 100 (%)) after 1,000 hours of sunshine weather-o-meter test.

What is claimed is:

1. A curable composition comprising a curing agent and a fluorine-containing copolymer having fluidity at room temperature and comprising, based on entire polymer units, from 20 to 70 mol % of polymer units (1) derived from a fluoroolefin and from 1 to 80 mol % of polymer units (2') having a polyoxyalkylene chain having, at its terminal, a group selected from the group consisting of an active hydrogen-containing group, an epoxy group, the total of the polymer units (1) and the polymer units (2') being from 30 to 100 mol %.

2. The curable composition according to claim 1, wherein the active hydrogen-containing group is a group selected from the group consisting of a hydroxyl group, a carboxylic acid group, an amino group, a thiol group and an acid amide group.

3. The curable composition according to claim 1, wherein the active hydrogen-containing group is a hydroxyl group.

4. The curable composition according to claim 1, wherein the polyoxyalkylene chain is a polyoxyalkylene chain having from 5 to 50 oxyalkylene units.

5. The curable composition according to claim 1, wherein the polyoxyalkylene chain is composed of oxyalkylene units having from 2 to 8 carbon atoms.

6. The curable composition according to claim 1, wherein the fluorine-containing copolymer has a viscosity of from 300 to 100,000 centipoise at 25° C.

7. The curable composition according to claim 1, wherein the curing agent is a polyvalent isocyanate compound or an aminoplasto compound.

8. The curable composition according to claim 1, wherein the curing agent is a polyvalent isocyanate compound.

9. The curable composition according to claim 1, wherein the curing agent is a polyol-modified polyisocyanate.

10. The curable composition according to claim 1, which further contains a filler.

11. The curable composition according to claim 10, wherein the filler is contained in an amount of from 1 to 500 parts by weight per 100 parts by weight of the fluorine-containing copolymer.

12. The curable composition according to claim 10, wherein the filler is selected from the group consisting of fumed silica, precipitated silica, silicic anhydride, hydrous silicic acid, carbon black, surface-treated fine calcium carbonate, surface-treated aluminum hydroxide, calcined clay, clay, titanium oxide, calcium carbonate, magnesium carbonate, talc, ferric oxide, zinc oxide and silica balloons.

13. A curable composition containing a fluorine-containing copolymer having fluidity at room temperature and comprising, based on entire polymer units, from 20 to 70 mol % of polymer units (1) derived from a fluoroolefin and from 1 to 80 mol % of polymer units (2") having a polyoxyalkylene chain having, at its terminal, a functional group cross-linkable by the action of moisture, the total of the polymer units (1) and the polymer units (2") being from 30 to 100 mol %.

14. The curable composition according to claim 13, wherein the functional group cross-linkable by the action of moisture is a group selected from the group consisting of an isocyanate group, a hydrolyzable silyl group and a thiol group.

15. The curable composition according to claim 13, wherein the polyoxyalkylene chain is a polyoxyalkylene chain having from 5 to 50 oxyalkylene units.

16. The curable composition according to claim 13, wherein the polyoxyalkylene chain is composed of oxyalkylene units having from 2 to 8 carbon atoms.

17. The curable composition according to claim 13, wherein the fluorine-containing copolymer has a viscosity of from 300 to 100,000 centipoise at 25° C.

18. The curable composition according to claim 13, which further contains a filler.

19. The curable composition according to claim 18, wherein the filler is contained in an amount of from 1 to 500 parts by weight per 100 parts by weight of the fluorine-containing copolymer.

20. The curable composition according to claim 18, wherein the filler is selected from the group consisting of fumed silica, precipitated silica, silicic anhydride, hydrous silicic acid, carbon black, surface-treated fine calcium carbonate, calcined clay, clay, titanium oxide, magnesium carbonate, talc, ferric oxide, zinc oxide and silica balloons.

* * * * *